(12) United States Patent
Mori (10) Patent No.: US 7,219,953 B2
(45) Date of Patent: May 22, 2007

(54) COWL COVER WITH INTEGRATED WASHER FLUID PASSAGEWAY

(75) Inventor: Tatsuro Mori, Novi, MI (US)

(73) Assignee: Nissan Technical Center North America, Inc. MI (US)

( * ) Notice: Subject to any disclaimer, the term of this patent is extended or adjusted under 35 U.S.C. 154(b) by 134 days.

(21) Appl. No.: 11/077,114

(22) Filed: Mar. 11, 2005

(65) Prior Publication Data

US 2006/0202516 A1    Sep. 14, 2006

(51) Int. Cl.
*B62D 25/08* (2006.01)
(52) U.S. Cl. .................... 296/192; 239/284.1
(58) Field of Classification Search ............. 296/192, 296/208; 239/284.1; 15/250.01
See application file for complete search history.

(56) References Cited

U.S. PATENT DOCUMENTS

| 4,893,865 | A | 1/1990 | McClain et al. |
| 5,098,637 | A | 3/1992 | Hendry |
| 5,204,050 | A | 4/1993 | Loren |
| 2001/0003352 | A1 | 6/2001 | Ruden et al. |
| 2003/0178873 | A1 | 9/2003 | Kato et al. |
| 2005/0040674 | A1* | 2/2005 | Vanlterson ............ 296/192 |

* cited by examiner

*Primary Examiner*—Lori L. Lyjak
(74) *Attorney, Agent, or Firm*—Global IP Counselors, LLP (57) ABSTRACT

A cowl cover is produced with an integrated washer fluid passageway using a gas-assisted injection molding process. The cowl cover has a single unitary layer that is defined between upper and lower surfaces. The washer fluid passageway is formed in the single unitary layer between the upper and lower surfaces including by gas-assisted injection molding such that the cowl cover is a unitary, single-piece homogenous member.

26 Claims, 11 Drawing Sheets

COWL COVER WITH INTEGRATED WASHER FLUID PASSAGEWAY

BACKGROUND OF THE INVENTION

1. Field of the Invention

The present invention generally relates to a cowl cover with an integrated washer fluid passageway. More specifically, the present invention relates to a cowl top cover that is formed by gas-assisted injection molding so as to include an integrated washer fluid passageway.

2. Background Information

Generally, most vehicles have a cowl box that is disposed in an area between a front windshield and a fire wall of an engine room to divide the engine room and an interior part of the vehicle. The cowl box usually has a cowl cover that overlies an upward opening of the cowl panel. The cowl cover is provided with air inlets so that an outside air is drawn to the cowl box. The air drawn to the cowl box is used for the air conditioning and/or directly sent to the vehicle interior through a duct coupling the cowl box and the vehicle interior. The windshield wipers are also often mounted on the cowl box and extend trough openings in the cowl box cover. One example of such a cowl box is disclosed in U.S. Patent Publication No. 2003/0178873.

In the past, the windshield washer nozzles were typically mounted on the vehicle hood. However, some vehicles have recently installed the windshield washer nozzles on the cowl cover to improve the appearance of the vehicle. However, with this type of arrangement, the washer tubes sometimes interfere with the windshield wipers. Moreover, the washer tubes sometime make a rattling noise when they vibrate on the cowl cover. Due to these concerns, the washer tubes should be mounted with sufficient clearance from the windshield wiper system and the cowl cover itself. These design considerations limit the possible designs of the cowl box and the cowl cover. One example of such a cowl structure that has integrated wipers and washer fluid passages is disclosed in U.S. Pat. No. 4,893,865.

In view of the above, it will be apparent to those skilled in the art from this disclosure that there exists a need for an improved cowl cover with an integrated washer fluid passageway. This invention addresses this need in the art as well as other needs, which will become apparent to those skilled in the art from this disclosure.

SUMMARY OF THE INVENTION

One object of the present invention is to provide a cowl cover that includes a washer fluid passageway formed integrally therewith.

The foregoing object can basically be attained by providing a vehicle cowl cover having an upper surface, a lower surface, a front edge, a rear edge and a pair of side edges. The upper surface faces generally in an upward vehicle direction, while the lower surface faces generally in a downward vehicle direction. The front edge is disposed between the upper and lower surfaces. The rear edge is disposed between the upper and lower surfaces. The side edges are disposed between the upper and lower surfaces and interconnect the front and rear edges with a single unitary layer being defined between the upper and lower surfaces. The single unitary layer defined between the upper and lower surfaces includes a washer fluid passageway formed by gas-assisted injection molding such that the cowl cover is a unitary, single-piece homogenous member.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
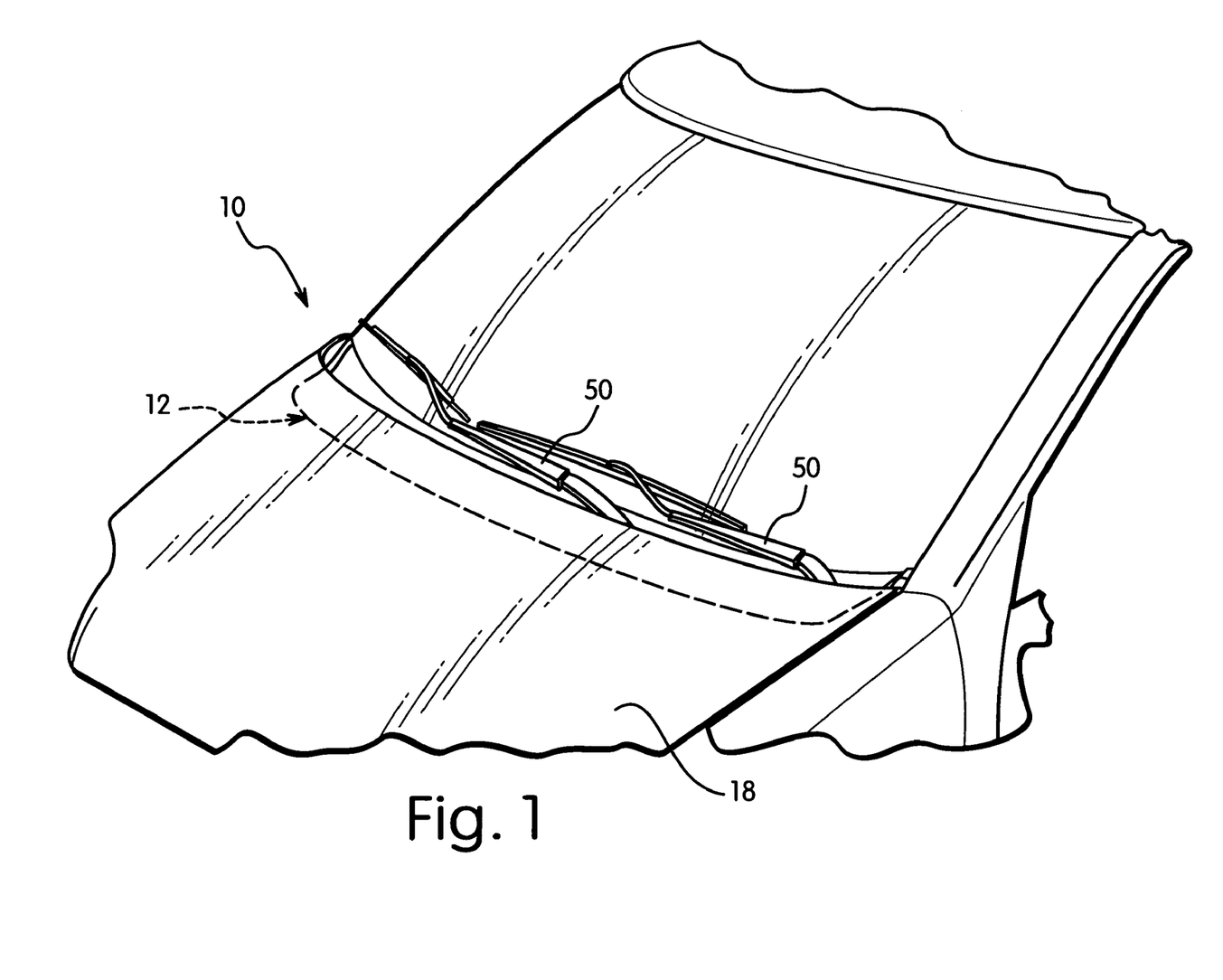
FIG. 1 is a partial perspective view of a vehicle having a vehicle cowl structure with in accordance with the present invention.

Referring initially to FIG. 1, a vehicle 10 is illustrated that is equipped with a vehicle cowl cover 12 in accordance with a first embodiment of the present invention. The precise construction of the vehicle body 10 is not important to the present invention. Thus, simplified illustrations of the vehicle body 10 will be used to describe the present invention. Also since the majority of the structure of the vehicle 10 is conventional and/or not important to the present invention, only those parts or portions of the vehicle body 10 that relate to the present invention will be discussed or illustrated herein for the sake of brevity.

Figure 2:
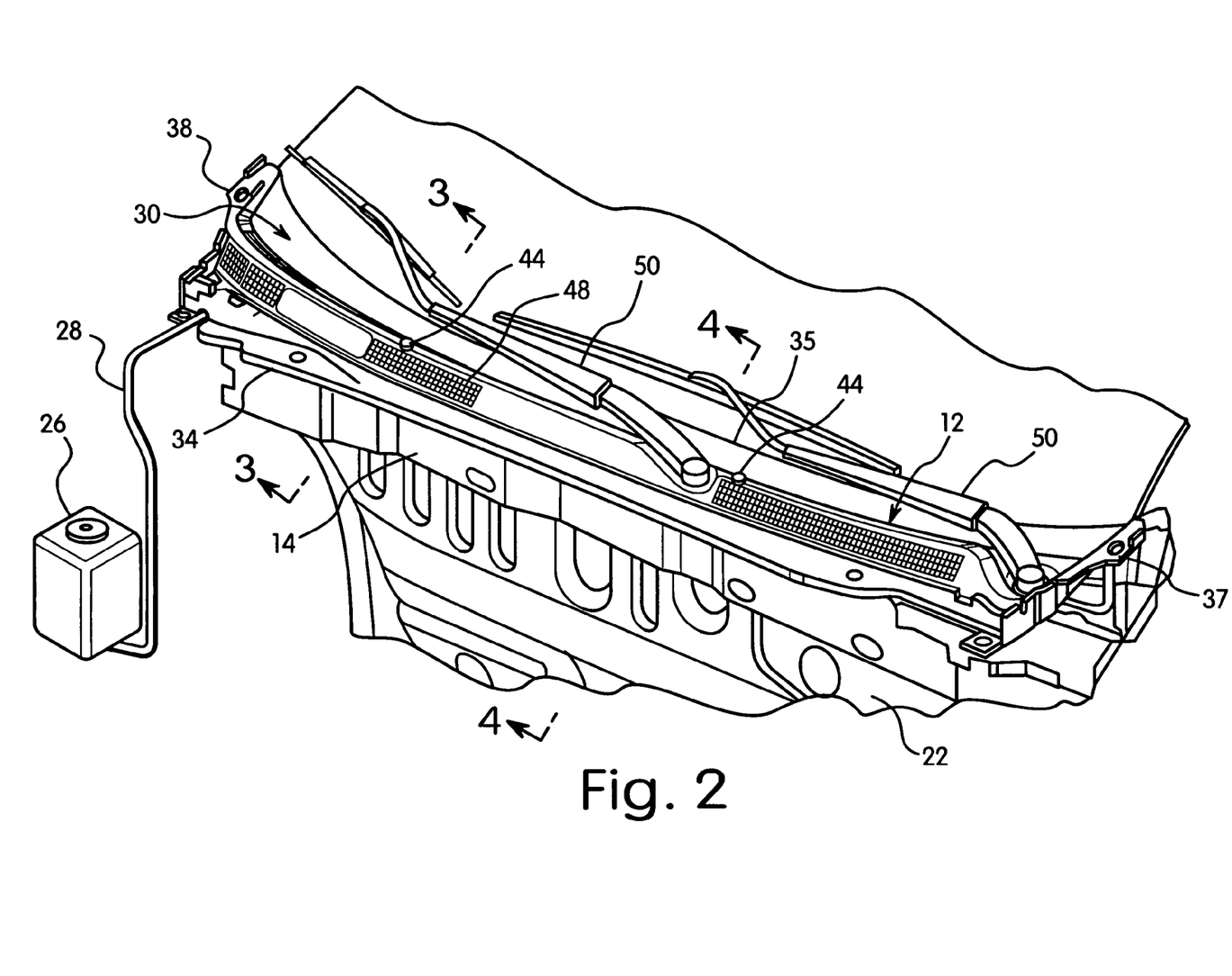
FIG. 2 is a top perspective view of the vehicle illustrated in FIG. 1 with portions removed to show the vehicle cowl structure in accordance with the present invention.
Figure 3:
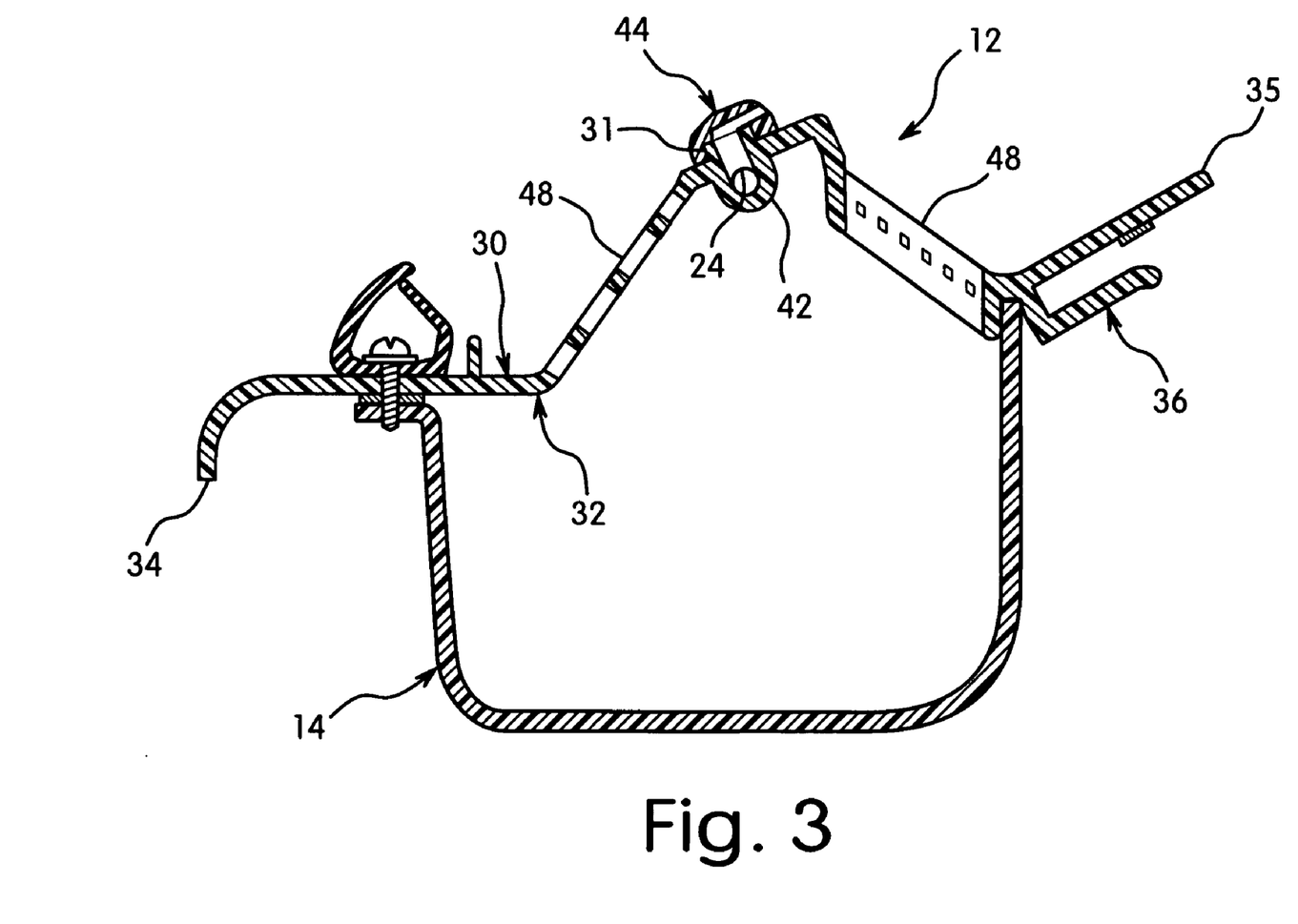
FIG. 3 is a simplified cross sectional view of the cowl cover mounted on the cowl box as seen along section line 3-3 of FIG. 2.
Figure 4:
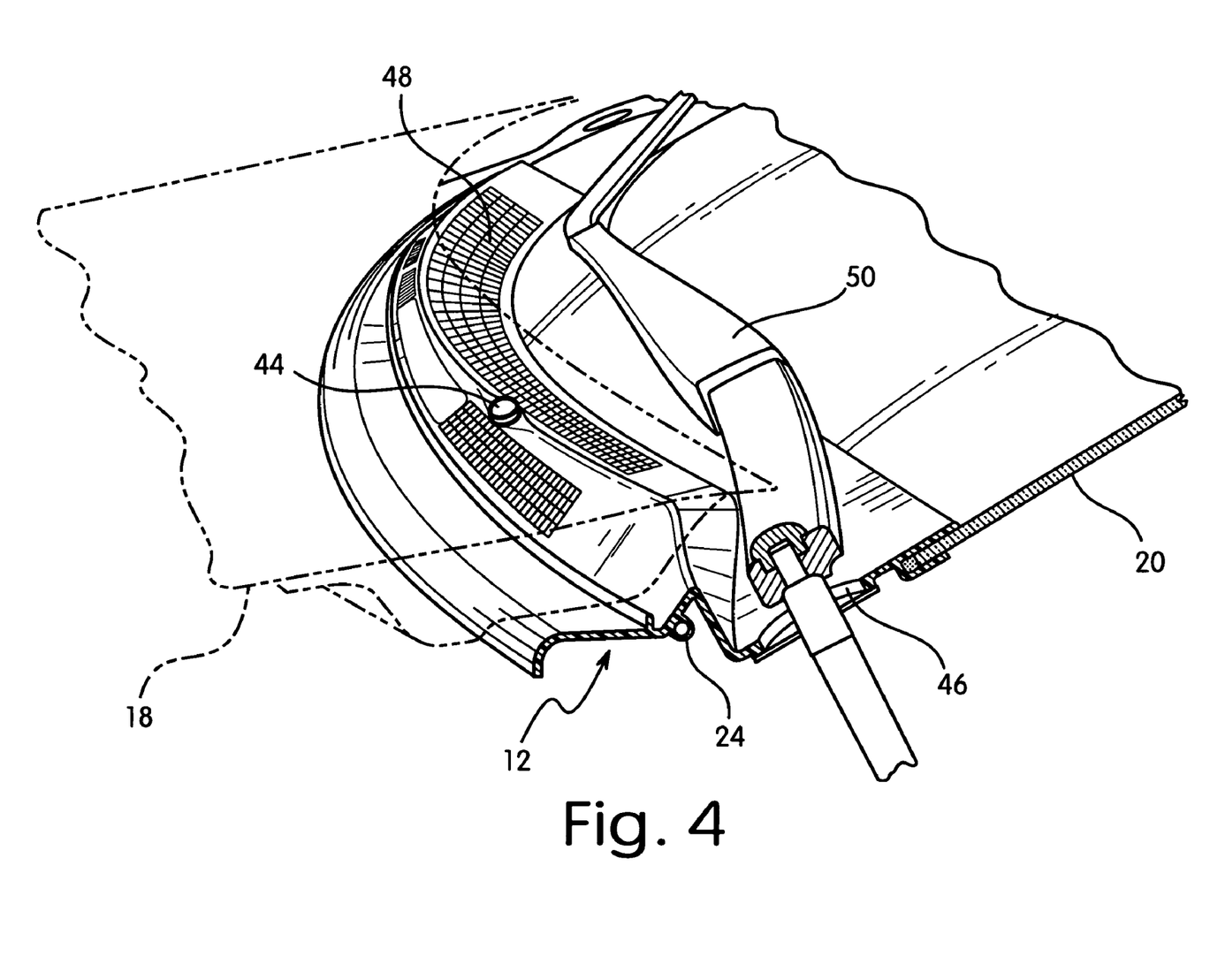
FIG. 4 is a cross sectional view of the vehicle cowl cover in partial perspective as seen along section line 4-4 of FIG. 2.

As seen in FIGS. 2 and 3, the vehicle cowl cover 12 is configured and arranged to be installed in an area of the vehicle body 10 that overlies a top opening of a cowl box 14. Moreover, the vehicle cowl cover 12 is fixedly mounted to a pair of hood ledges of the vehicle 10 at its lateral side ends in a conventional manner. The vehicle cowl cover 12 is further configured and arranged at least partial below the rear edge of a vehicle hood 18 of the vehicle 10 and to engage the lower edge of the front windshield 20 of the vehicle 10. Thus, the vehicle cowl cover 12 is located in front of a fire wall structure 22 that divides an interior part of the vehicle from an engine compartment. Accordingly, the vehicle cowl cover 12 is configured and arranged between the vehicle hood 18 and the vehicle windshield 20 such that the vehicle cowl cover 12 provides intake air to the vehicle.

The entire configuration of the vehicle cowl cover 12 is not important to the present invention. Thus, simplified illustrations will be used to describe those portions of the vehicle cowl cover 12 that are not particularly important to the present invention. The vehicle cowl cover 12 includes forms a part of an air intake system for the ventilation system (not shown) of the vehicle.

Figure 5:
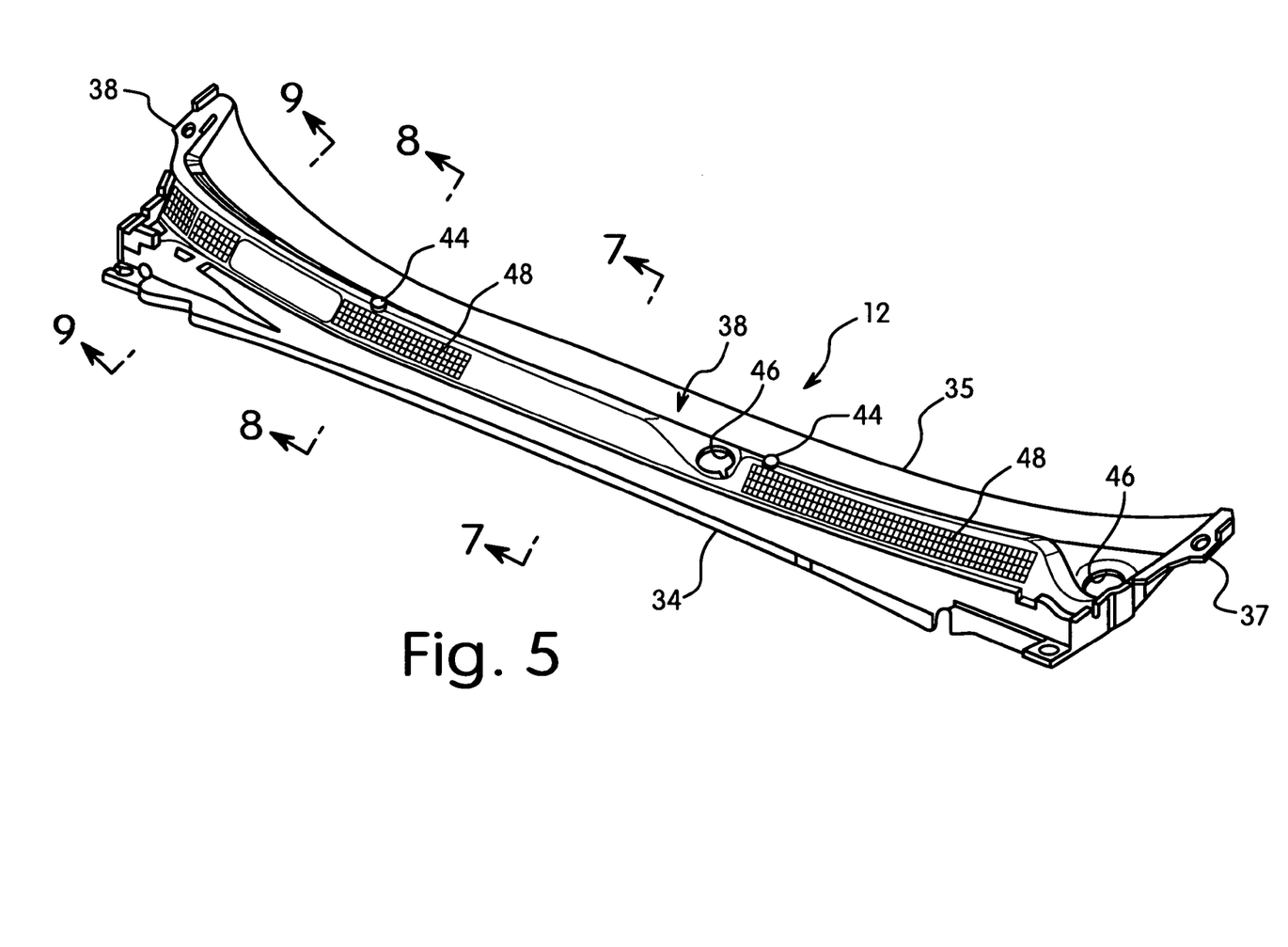
FIG. 5 is a top perspective view of the vehicle cowl structure in accordance with the present invention.
Figure 6:
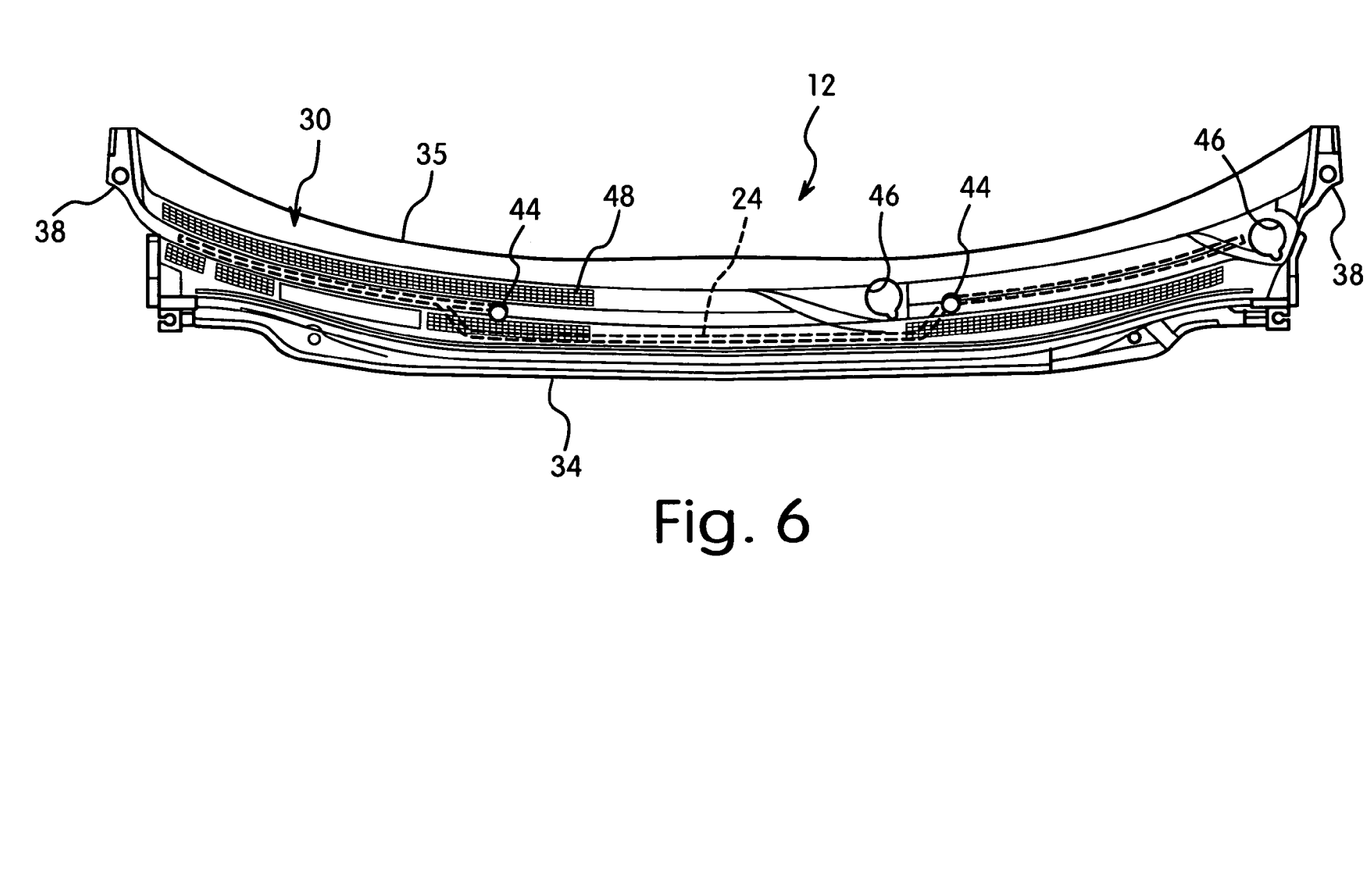
FIG. 6 is a top plan view of the vehicle cowl structure in accordance with the present invention.
Figure 7:
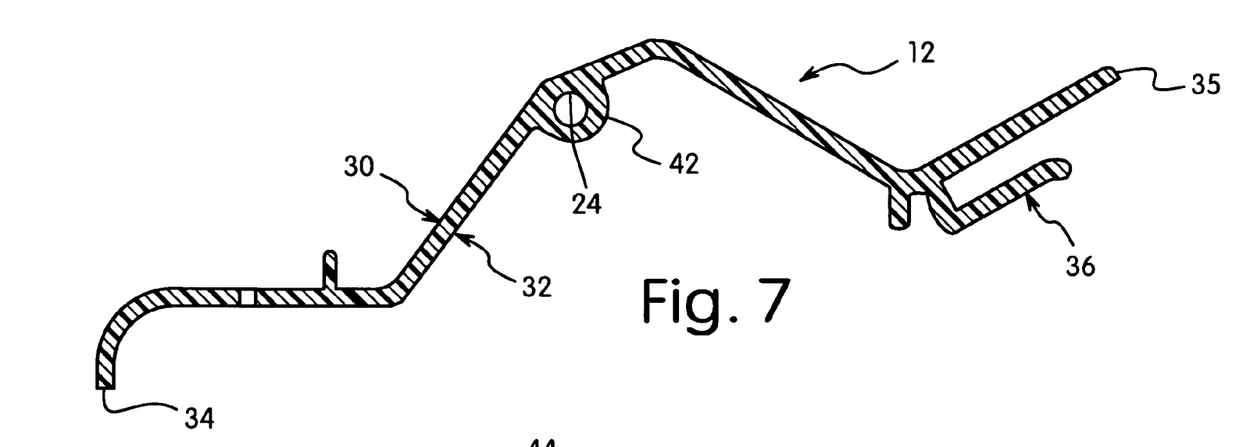
FIG. 7 is a simplified cross sectional view of the cowl cover as seen along section line 7-7 of FIG. 5.
Figure 8:
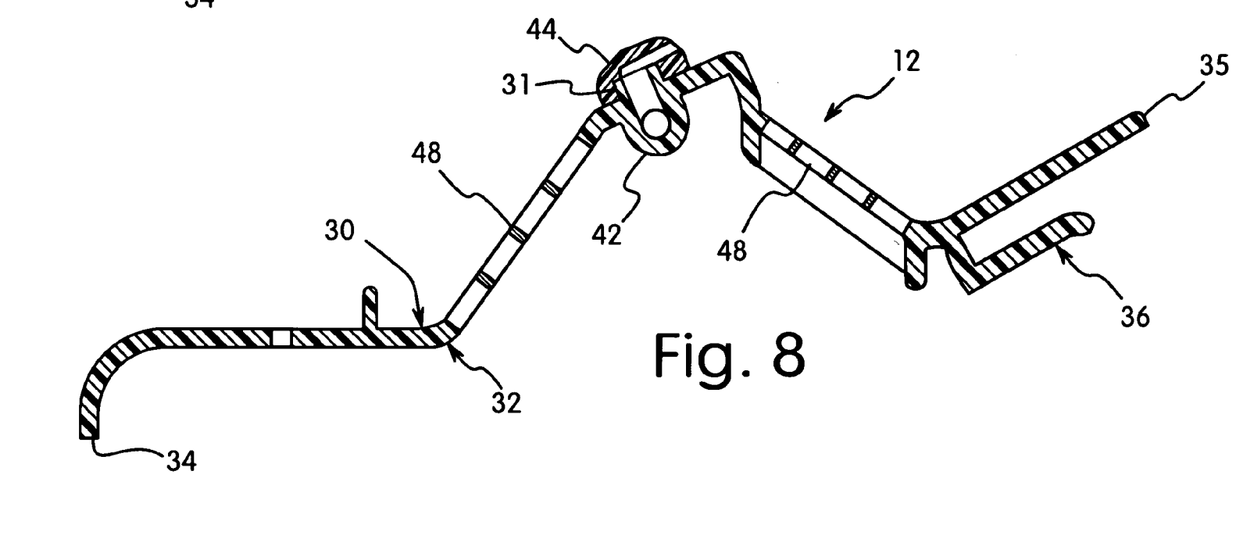
FIG. 8 is a simplified cross sectional view of the cowl cover as seen along section line 8-8 of FIG. 5.
Figure 9:
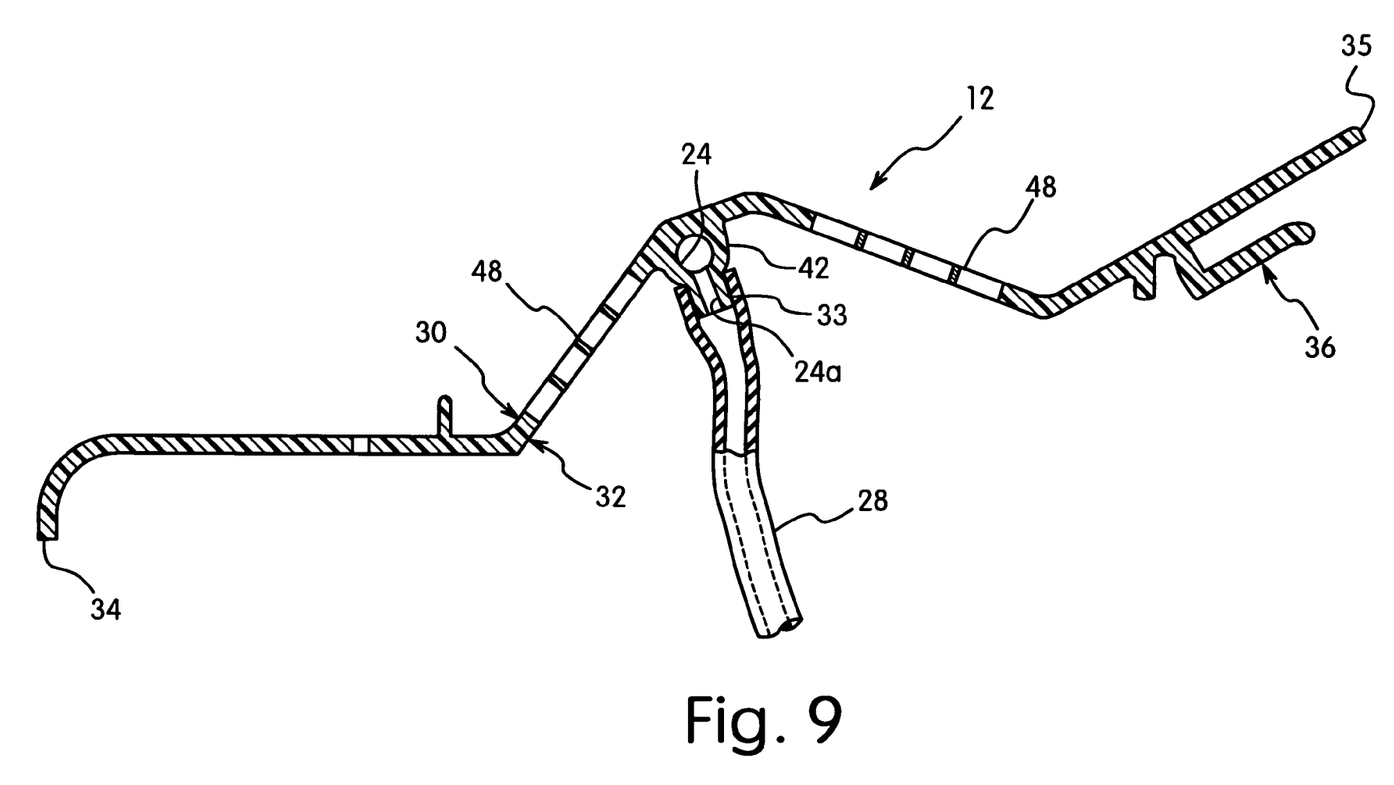
FIG. 9 is a simplified cross sectional view of the cowl cover as seen along section line 9-9 of FIG. 5.

As seen in FIGS. 5 and 6, the vehicle cowl cover 12 is preferably constructed as a one-piece, unitary member that is formed as a contoured sheet element. Preferably, the vehicle cowl cover 12 is constructed from a rigid lightweight material such as a hard rigid plastic material that is molded using a gas-assisted injection molding, as explained below. The plastic resin employed can, for example, be selected from a variety of thermoplastic resins. For example, the vehicle cowl cover 12 can be made of polypropylene materials that are used in automotive parts. Other examples of suitable materials for the vehicle cowl cover 12 includes, but not limited to, acrylonitrile-butadiene-styrene (ABS) resins, acrylonitrile-butadiene-styrene/polycarbonate blends, polyesters, polyvinyls, polycarbonate/polyester blends, and mixtures thereof, among others. Preferably, the plastic employed has sufficient rigidity to carry out the present invention.

The vehicle cowl cover 12 is formed by gas-assisted injection molding such that an integrated washer fluid passageway 24 is formed. As seen in FIG. 2, the integrated washer fluid passageway 24 is fluidly connected to a washer fluid reservoir 26 by a flexible hose or tube 28.

Referring to FIGS. 5-11, basically, the vehicle cowl cover 12 has an upper surface 30 with a pair of laterally spaced nozzle mounting structures 31 (FIG. 8), a lower surface 32 with an inlet structure 33 (FIG. 9), a front edge 34, a rear edge 35 with a windshield engagement structure 36 and a pair of side edges 37 and 38 (FIG. 6). The upper surface 30 faces generally in an upward vehicle direction, while the lower surface 32 faces generally in a downward vehicle direction. The front edge 34 is disposed between the upper and lower surfaces 30 and 32. The rear edge 35 is disposed between the upper and lower surfaces 30 and 32. The side edges 37 and 38 are disposed between the upper and lower surfaces 30 and 32 and interconnect the front and rear edges 34 and 36 with a single unitary layer being defined between the upper and lower surfaces 30 and 32. Thus, the single unitary layer defined between the upper and lower surfaces 30 and 32 includes the washer fluid passageway 24 formed by gas-assisted injection molding such that the cowl cover 12 is a unitary, single-piece homogenous member.

Preferably, the single unitary layer defined between the upper and lower surfaces 30 and 32 protrudes outwardly from the lower surface 32 of the vehicle cowl cover 12 to form a reinforcing rib 42. Of course, the washer fluid passageway 24 of the vehicle cowl cover 12 can be formed such either one or both of the upper and lower surfaces 30 and 32 protrudes outwardly to form a reinforcing rib. In any event, preferably, at least one of the upper and lower surfaces 30 and 32 protrudes outwardly along the washer fluid passageway 24 to form a reinforcing rib 42. The washer fluid passageway 24 preferably extends generally in a lateral vehicle direction between the side edges 37 and 38. Thus, the reinforcing rib 42 preferably extends generally in a lateral vehicle direction between the side edges 37 and 38. Of course, as seen in the illustrated embodiment, the washer fluid passageway 24 and the reinforcing rib 42 can have a somewhat serpentine path between the side edges 37 and 38. By configuring and arranging the washer fluid passageway 24 and the reinforcing rib 42 to extend approximately at least a majority of a lateral dimension of the vehicle cowl cover 12, as measured perpendicularly between the side edges 37 and 38, the vehicle cowl cover 12 can be reinforced such that a thinner and/or less rigid material can be used for the remaining portions of the vehicle cowl cover 12.

The washer fluid passageway 24 has an inlet opening 24a formed in the inlet structure 33 of the lower surface 32 and a pair of laterally spaced outlet or nozzle openings 24b formed in the nozzle mounting structures 31. Each of the nozzle mounting structures 31 has a washer fluid nozzle 44 mounted thereon, with the washer fluid nozzle 44 fluidly communicating with the nozzle openings 24b of the washer fluid passageway 24. Thus, the washer fluid reservoir 26 is fluidly connected to the washer fluid nozzles 44. In particular, one end of the flexible tube 28 (FIG. 9) is attached to the inlet structure 33 such that the washer fluid reservoir 26 (FIG. 2) fluidly communicates with the washer fluid nozzles 44 via the flexible tube 28 and the washer fluid passageway 24.

Figure 10:
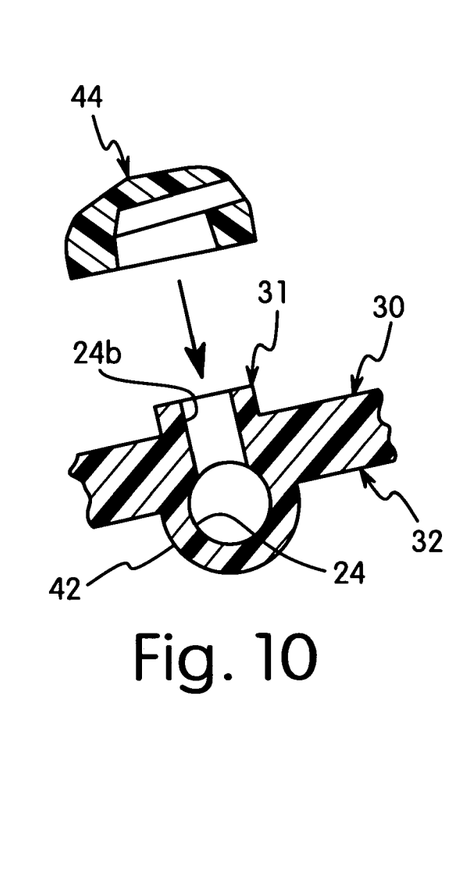
FIG. 10 is a simplified partial cross sectional view of the cowl cover with one of the nozzles exploded from the cowl cover.
Figure 11:
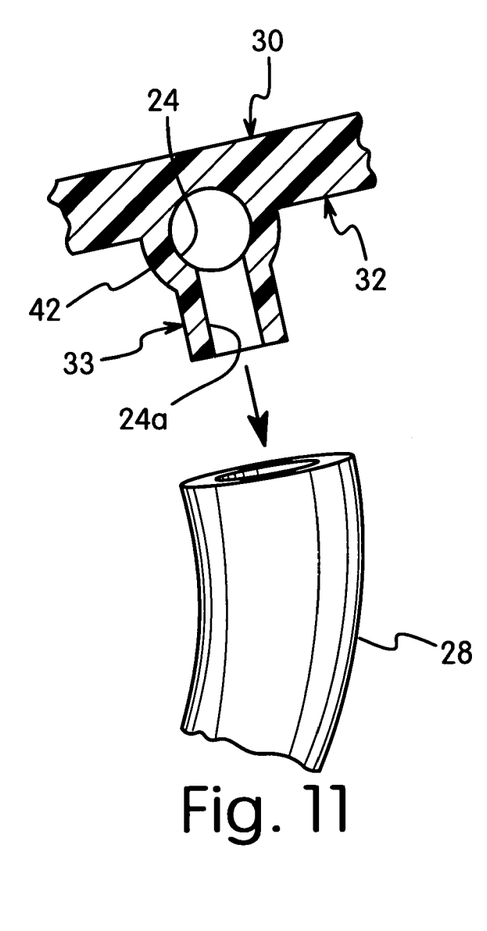
FIG. 11 is a simplified partial cross sectional view of the cowl cover showing the inlet structure of the cowl cover prior to connection with the washer fluid tube.

In this embodiment, as seen in FIGS. 10 and 11, the nozzle mounting structures 31 are nozzle mounting projections that include the nozzle openings 24b, respectively, while the inlet structure 33 is a tube mounting projection that includes the inlet opening 24a. The washer fluid nozzles 44 are fixedly mounted on the nozzle mounting projections or structures 31 in a conventional manner. For example, the washer fluid nozzles 44 are fixed on the nozzle mounting structures 31 by an adhesive.

Figure 12:
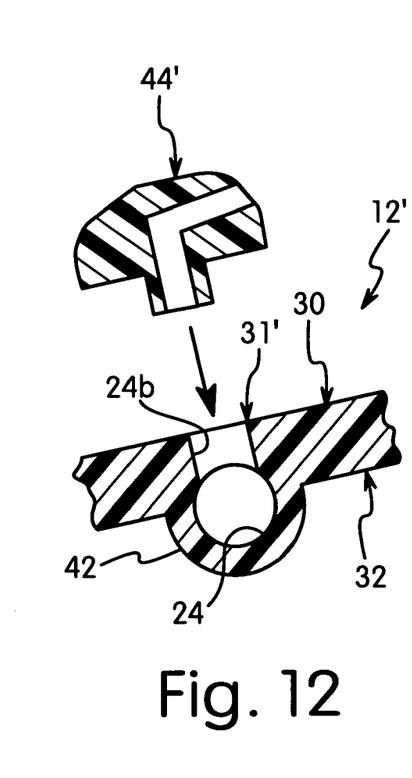
FIG. 12 is a simplified partial cross sectional view of a modified cowl cover with one of the nozzles exploded from the cowl cover.

Alternatively, as seen in FIG. 12, the vehicle cowl cover 12' can have a pair of modified nozzle mounting structures 31' (only one shown) and a pair of modified washer fluid nozzles 44' (only one shown). In other words, the nozzle mounting structures 31' are merely holes instead of projections and the washer fluid nozzles 44' includes mounting projections. In view of the similarity between the modified vehicle cowl cover 12' of FIG. 12 and the vehicle cowl cover 12 of FIGS. 1-11, the modified vehicle cowl cover of FIG. 12 will not be described and illustrated in detail. Rather, the parts of the modified vehicle cowl cover 12' of FIG. 12 that are identical to the parts of the vehicle cowl cover of FIGS. 1-11 will be given the same reference numerals. Moreover, the descriptions of the parts of the second embodiment that are identical to the parts of the first embodiment may be omitted for the sake of brevity. Thus, unless otherwise specified, the configuration of the modified vehicle cowl cover 12' of FIG. 12 is the same as that of the vehicle cowl cover 12 of FIGS. 1-11.

The vehicle cowl cover 12 or 12' has a variety of conventional features that are commonly found in the vehicle cowl covers such as a pair of windshield wiper openings 46 and air vent openings 48. The windshield wiper openings 46 are configured and arranged such that the wiper arms 50 of a windshield wiper unit (not shown) extend through the vehicle cowl cover 12. The windshield wiper unit (not shown) is mounted on the cowl box 14 in a conventional manner. The air drawn to the cowl box 14 is used for the air conditioning and/or directly sent to the vehicle interior through a duct system (not shown) that couples the cowl box 14 to the vehicle interior. Since the air vent openings 48 of the vehicle cowl cover 12 are open to the environment, water often enters through the air vent openings 48 of the vehicle cowl cover 12 and collects in the cowl box 14. Thus, the cowl box 14 is configured and arranged to drain the water that collects in the cowl box 14. The air vent openings 48 provide air inlets so that outside air can be drawn to the cowl box 14. Since these conventional features of the vehicle cowl cover 12 are not important by themselves to the present invention, these conventional features of the vehicle cowl cover 12 will not be discussed or illustrated in further detail herein.

Now referring to FIGS. 13-17, one preferred method of producing the vehicle cowl cover 12' of the present invention will be discussed. Of course, the same process is used for producing the vehicle cowl cover 12' of the present invention, except for a slightly different mold shape to produce the nozzle mounting structures 31. Basically, the process of producing the vehicle cowl cover 12 or 12' of the present invention by gas-assist injection molding includes injecting a cowl material (plastic resin) into a mold cavity 60 in an amount less than the total volume of the mold cavity 60 and then injecting an inert gas into the molding cavity 60 before the cowl material to form the washer fluid passageway 24 with the inlet and outlet openings 24a and 24b. The gas-assisted injection molding process of the present invention allows for the production of unitary, one-piece cowl cover 12 or 12'. Gas-assisted injection molding methods are well known in the art, as set forth in, for example, U.S. Pat. Nos. 5,098,637 and 5,204,050 and need not be discussed in great detail herein.

Figure 13:
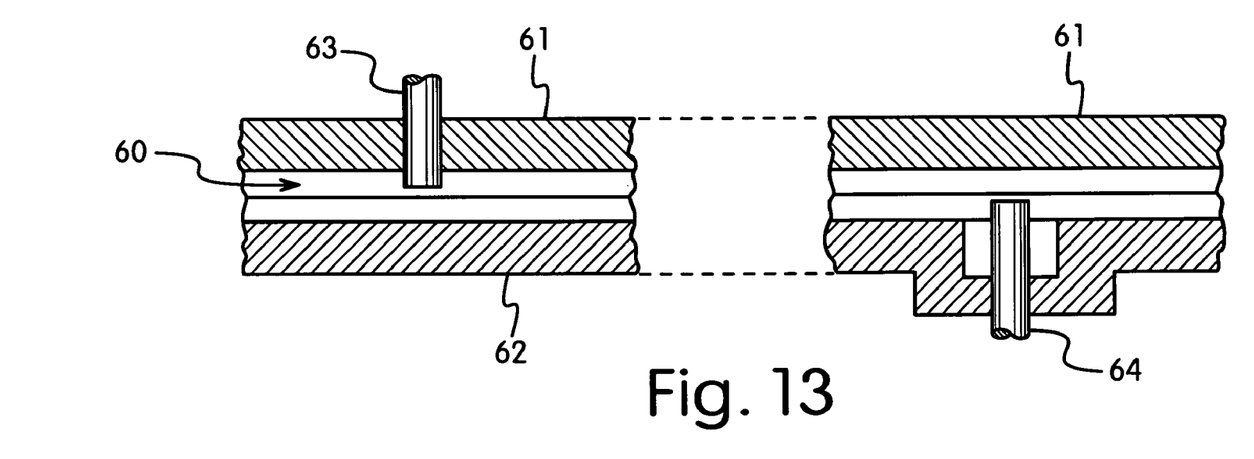
FIG. 13 is a simplified partial cross sectional view of a mold for producing the cowl cover with the inlet structure illustrated in FIG. 11 and the nozzle structure shown in FIG. 12.
Figure 14:
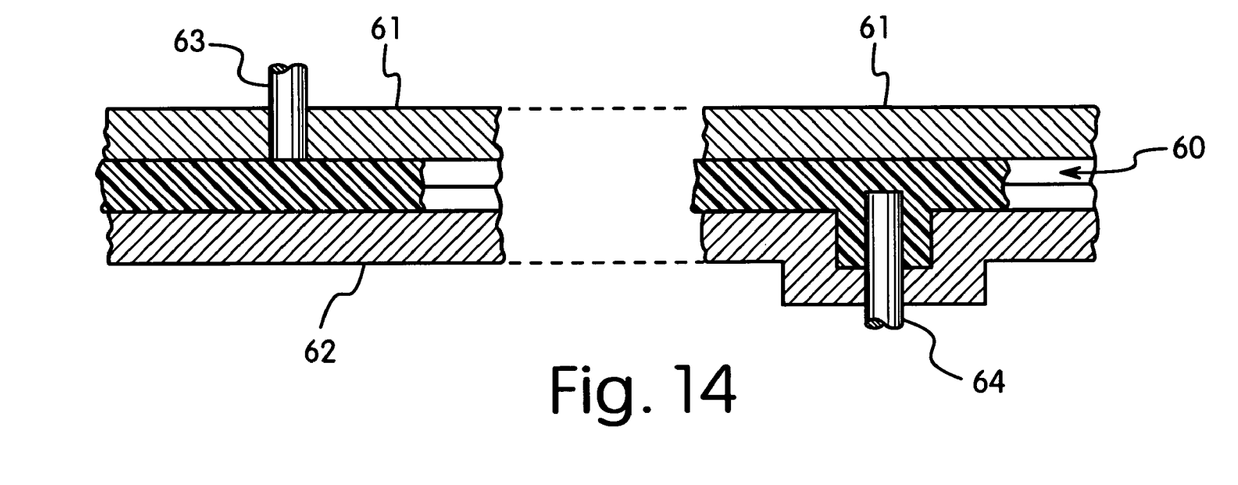
FIG. 14 is a simplified partial cross sectional view of the mold illustrated in FIG. 13 after the mold cavity has been injected with a plastic resin.
Figure 15:
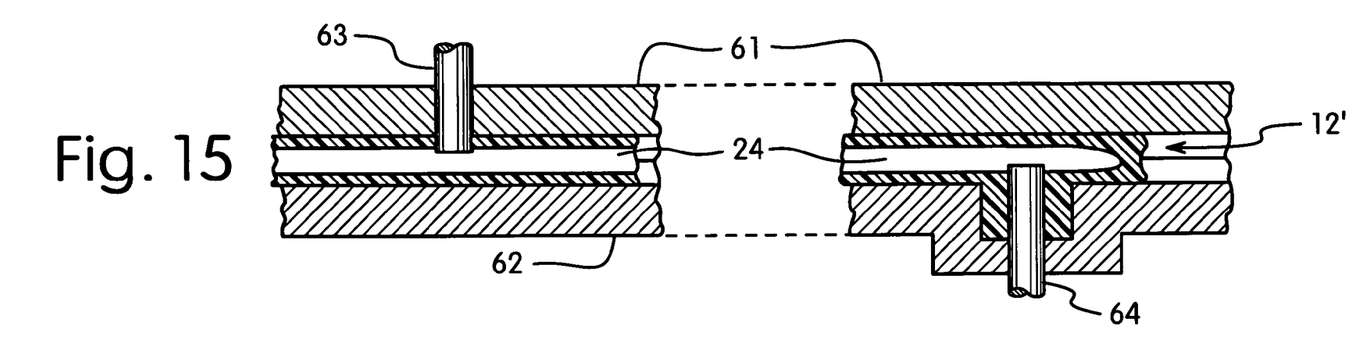
FIG. 15 is a simplified partial cross sectional view of the mold illustrated in FIGS. 13 and 14 after the mold cavity has been injected with a plastic resin and a gas has been injected to form the washer fluid passageway.

More specifically, to produce the vehicle cowl cover 12 or 12' of the present invention, an extruded plastic resin is injected into the mold cavity 60 which has the geometry of the desired cowl cover end product. In the illustrate embodiment, the mold cavity 60 is formed by a mold having a pair of tools or molding parts 61 and 62 (only portions shown herein for the sake of simplicity) and using pins 63 and 64 for forming the inlet and outlet openings 24a and 24b. Once the cowl material (plastic resin) is injected into the mold having the molding cavity 60, an overall shape of the cowl cover 12 or 12' is formed as a single unitary layer defined by the upper and lower surfaces 30 and 32. Preferably, the amount of cowl material (plastic resin) is injected into the mold having the molding cavity 60 is slightly less than the total volume of the mold cavity 60 by an amount equal to the volume of the passageway 24. Now, an inert gas is injected into a center portion of the molding cavity 60 that contains the cowl material. This injecting of the inert gas into the molding cavity 60 occurs before the cowl material has hardened. Thus, injecting of the inert gas into the molding cavity 60 forms the washer fluid passageway 24. In other words, the inert gas is injected into a center portion of the mold cavity 60 such that a hollow gas channel (the washer fluid passageway 24) extending throughout the center portion is formed by forcing the plastic resin to flow along an outer surface of the mold cavity 60. The inert gas can be injected into the mold cavity 60 at the same location as the plastic is injected, or alternatively, at a separate location. The inert gas employed can be air, helium, neon, argon, carbon dioxide, nitrogen, and mixtures thereof.

Figure 16:
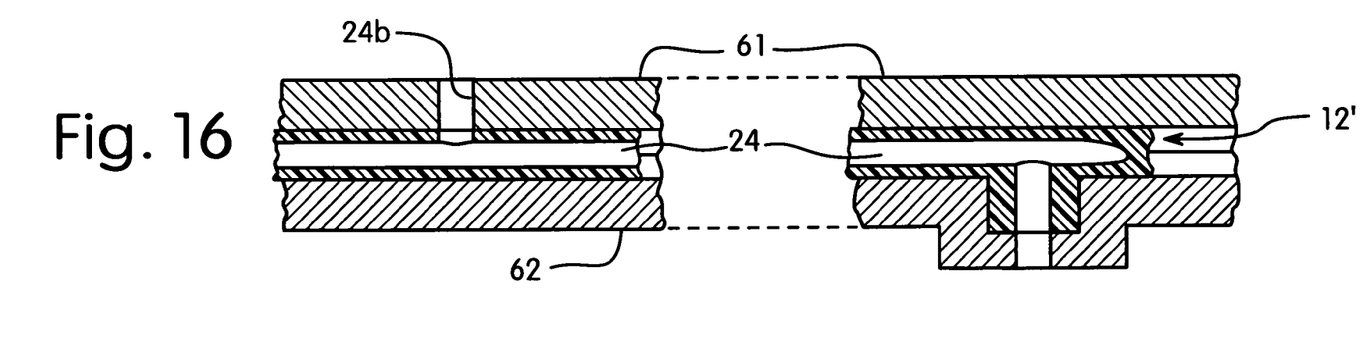
FIG. 16 is a simplified partial cross sectional view of the mold illustrated in FIGS. 13 and 14 after the pins have been removed to expose the inlet structure and the nozzle structure.
Figure 17:
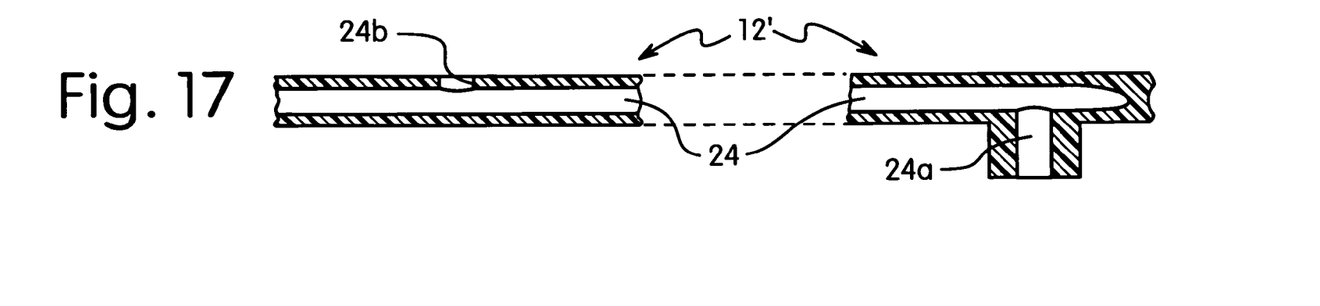
FIG. 17 is a simplified partial cross sectional view of the modified cowl cover illustrated in FIG. 13 to show the inlet structure and the nozzle structure.

Once the cowl material (plastic resin) hardens, the pins 63 and 64 are removed for exposing the inlet and outlet openings 24a and 24b. The washer fluid nozzles 44 are then fixedly mounted on the nozzle mounting projections or structures 31 in a conventional manner.

As used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A molded cowl cover comprising:
   an upper surface facing generally in an upward vehicle direction including at least one nozzle mounting projection having an outer surface configured to receive and support a washer nozzle;
   a lower surface facing generally in a downward vehicle direction;
   a front edge disposed between the upper and lower surfaces;
   a rear edge disposed between the upper and lower surfaces; and
   a pair of side edges disposed between the upper and lower surfaces and interconnecting the front and rear edges with a single unitary layer being defined between the upper and lower surfaces,
   the single unitary layer defined between the upper and lower surfaces including a washer fluid passageway formed by gas-assisted injection molding such that the cowl cover is a unitary, single-piece homogenous member, the washer fluid passageway fluidly communicating with the nozzle mounting projection.

2. The molded cowl cover according to claim 1, wherein the single unitary layer defined between the upper and lower surfaces protrudes outwardly from at least one of the upper and lower surfaces along the washer fluid passageway to form a reinforcing rib.

3. The molded cowl cover according to claim 1, wherein the single unitary layer defined between the upper and lower surfaces protrudes outwardly from the lower surface along the washer fluid passageway to form a reinforcing rib.

4. The molded cowl cover according to claim 3, wherein the washer fluid passageway extends generally in a lateral vehicle direction between the side edges.

5. The molded cowl cover according to claim 4, wherein the washer fluid passageway extends approximately at least a majority of a lateral dimension measured perpendicularly between the side edges.

6. The molded cowl cover according to claim 1, wherein the nozzle mounting projection includes a nozzle opening formed in the nozzle mounting projection that fluidly communicates with the washer fluid passageway.

7. The molded cowl cover according to claim 6, wherein the upper surface includes a second nozzle mounting projection spaced apart from the nozzle mounting projection, the second nozzle mounting projection including a nozzle opening that fluidly communicates with the washer fluid passageway.

8. The molded cowl cover according to claim 7, further comprising
a pair of nozzles mounted on the nozzle mounting projection and the second nozzle mounting projection.

9. The molded cowl cover according to claim 1, wherein the washer fluid passageway has an inlet opening formed in the lower surface that fluidly communicates with the washer fluid passageway.

10. The molded cowl cover according to claim 9, wherein the lower surface includes a tube mounting projection that includes the inlet opening.

11. The molded cowl cover according to claim 1, wherein the upper surface includes a pair of laterally spaced nozzle openings formed in the upper surface that fluidly communicates with the washer fluid passageway and extend linearly from the upper surface to the washer fluid passageway.

12. The molded cowl cover according to claim 11, wherein
the single unitary layer defined between the upper and lower surfaces protrudes outwardly from the lower surface along the washer fluid passageway to form a reinforcing rib.

13. The molded cowl cover according to claim 12, wherein
the washer fluid passageway extends generally in a lateral vehicle direction between the side edges.

14. The molded cowl cover according to claim 13, wherein
the washer fluid passageway approximately at least a majority of a lateral dimension measured perpendicularly between the side edges.

15. The molded cowl cover according to claim 1, wherein the molded cowl cover is made from a thermoplastic resin.

16. The molded cowl cover according to claim 1, wherein
the nozzle mounting projection extends linearly from the upper surface to the washer fluid passageway.

17. The molded cowl cover according to claim 1, wherein
the outer surface of the nozzle mounting projection has an annular shape extending outward from the upper surface.

18. The molded cowl cover according to claim 17, wherein
the nozzle mounting projection includes an nozzle opening fluidly communicating with the washer fluid passage and co-axially centered with respect to the annular shape of the nozzle mounting projection.

19. The molded cowl cover according to claim 7, wherein
the nozzle openings extend from respective ones of the nozzle mounting projection and the second nozzle mounting projection to the washer fluid passageway in a direction perpendicular to the washer fluid passageway.

20. The molded cowl cover according to claim 9, wherein
the inlet opening extends linearly from the lower surface to the washer fluid passageway.

21. A molded cowl cover assembly comprising:
an upper surface facing generally in an upward vehicle direction including a first nozzle opening;
a lower surface facing generally in a downward vehicle direction;
a front edge disposed between the upper and lower surfaces;
a rear edge disposed between the upper and lower surfaces;
a pair of side edges disposed between the upper and lower surfaces and interconnecting the front and rear edges with a single unitary layer being defined between the upper and lower surfaces; and
a first washer fluid nozzle having a first portion extending into the first nozzle opening and a second portion extending along an area of the upper surface surrounding the first nozzle opening,
the single unitary layer defined between the upper and lower surfaces including a washer fluid passageway formed by gas-assisted injection molding such that the cowl cover is a unitary, single-piece homogenous member with the first nozzle opening extending linearly from the upper surface to the washer fluid passageway.

22. The molded cowl cover according to claim 21, wherein
the upper surface includes a second nozzle opening spaced apart from the first nozzle opening, the second nozzle opening extending linearly from the upper surface to the washer fluid passageway.

23. The molded cowl cover according to claim 22, further comprising:
a second washer fluid nozzle having a first portion extending into the second nozzle opening and a second portion extending along an area of the upper surface surrounding the second nozzle opening.

24. A molded cowl cover comprising:
an upper surface facing generally in an upward vehicle direction;
a lower surface facing generally in a downward vehicle direction having a fluid inlet opening;
a front edge disposed between the upper and lower surfaces;

a rear edge disposed between the upper and lower surfaces; and a pair of side edges disposed between the upper and lower surfaces and interconnecting the front and rear edges with a single unitary layer being defined between the upper and lower surfaces, the single unitary layer defined between the upper and lower surfaces including a washer fluid passageway formed by gas-assisted injection molding such that the cowl cover is a unitary, single-piece homogenous member with the fluid inlet opening extending linearly from the washer fluid passageway to the lower surface.

25. The molded cowl cover according to claim 24, wherein the lower surface further including a tube mounting projection with the fluid inlet opening extending therethrough, the tube mounting projection configured to receive and support a fluid tube.

26. The molded cowl cover according to claim 25, wherein the tube mounting projection extends linearly from the lower surface to the washer fluid passageway.

* * * * *